(12) United States Patent
Lim et al.

(10) Patent No.: US 11,766,946 B2
(45) Date of Patent: Sep. 26, 2023

(54) SYSTEM FOR CHARGING BATTERY FOR VEHICLE

(71) Applicant: HYUNDAI AUTOEVER CORP., Seoul (KR)

(72) Inventors: Dong Hwi Lim, Yongin-si (KR); Kyo Min Kim, Seoul (KR)

(73) Assignee: Hyundai Autron Co., Ltd., Seoul (KR)

( * ) Notice: Subject to any disclaimer, the term of this patent is extended or adjusted under 35 U.S.C. 154(b) by 289 days.

(21) Appl. No.: 16/951,593

(22) Filed: Nov. 18, 2020

(65) Prior Publication Data

US 2021/0197681 A1 Jul. 1, 2021

(30) Foreign Application Priority Data

Dec. 27, 2019 (KR) .................. 10-2019-0176306

(51) Int. Cl.
| | |
|---|---|
| *B60L 53/22* | (2019.01) |
| *B60L 53/20* | (2019.01) |
| *H02J 7/04* | (2006.01) |
| *H02J 7/34* | (2006.01) |
| *B60L 50/60* | (2019.01) |
| *B60L 53/60* | (2019.01) |
| *H02J 7/00* | (2006.01) |
| *H02M 1/42* | (2007.01) |

(52) U.S. Cl.
CPC ............... *B60L 53/22* (2019.02); *B60L 50/60* (2019.02); *B60L 53/20* (2019.02); *B60L 53/60* (2019.02); *H02J 7/04* (2013.01); *H02J 7/345* (2013.01); *B60L 2210/10* (2013.01); *B60L 2210/30* (2013.01); *H02J 7/00711* (2020.01); *H02J 2207/20* (2020.01); *H02J 2207/50* (2020.01); *H02M 1/4208* (2013.01)

(58) Field of Classification Search
CPC ....................................... B60L 53/22
USPC ....................................... 320/109
See application file for complete search history.

(56) References Cited

U.S. PATENT DOCUMENTS

| | | | |
|---|---|---|---|
| 2007/0153560 A1* | 7/2007 | Zhang | ........ H02J 7/02 363/166 |
| 2012/0007551 A1* | 1/2012 | Song | ........ B60L 53/00 320/109 |

(Continued)

FOREIGN PATENT DOCUMENTS

| | | |
|---|---|---|
| KR | 10-1171908 B1 | 8/2012 |
| KR | 10-1509709 B1 | 4/2015 |

(Continued)

*Primary Examiner* — Jerry D Robbins

(74) *Attorney, Agent, or Firm* — MORGAN, LEWIS & BOCKIUS LLP

(57) ABSTRACT

A system for charging a battery for a vehicle may include a charging control device having a power factor correction circuit configured to convert an alternating current (AC) voltage of a charging apparatus into a direct current (DC) voltage, a DC-DC converter connected to the power factor correction circuit and configured to transform the DC voltage, a capacitor connected to an output terminal of the DC-DC converter, and a relay unit provided between the capacitor and the battery; and a control unit connected to the charging control device and configured to perform initial charging control in consideration of a capacitor voltage of the capacitor when the charging apparatus and the power factor correction circuit are connected by the control unit.

13 Claims, 5 Drawing Sheets

(56) References Cited

U.S. PATENT DOCUMENTS

| | | | |
|---|---|---|---|
| 2012/0104859 A1* | 5/2012 | Nii | B60L 53/22 |
| | | | 363/126 |
| 2018/0241303 A1* | 8/2018 | Rivera | H02M 3/158 |
| 2019/0241088 A1* | 8/2019 | Kimura | B60L 53/22 |
| 2020/0304026 A1* | 9/2020 | Mu | H02M 1/4208 |
| 2021/0124404 A1* | 4/2021 | Mohammad | G06F 1/3296 |
| 2021/0155100 A1* | 5/2021 | Khaligh | B60L 55/00 |

FOREIGN PATENT DOCUMENTS

| | | |
|---|---|---|
| KR | 101509925 B1 | 4/2015 |
| KR | 20180063941 A | 6/2018 |

\* cited by examiner

SYSTEM FOR CHARGING BATTERY FOR VEHICLE

CROSS-REFERENCE TO RELATED APPLICATIONS

The present application claims priority to Korean Patent Application No. 10-2019-0176306 filed on Dec. 27, 2019, the entire contents of which is incorporated herein for all purposes by this reference.

BACKGROUND OF THE INVENTION

Field of the Invention

The present invention relates to a system for charging a battery for a vehicle, and more particularly, to a system for charging a battery for a vehicle, which uses a low-speed charging controller.

Description of Related Art

Recently, to meet the stricter environmental regulations, various environment-friendly vehicles such as hybrid vehicles (HEVs), plug-in hybrid vehicles (PHEVs), and electric vehicles (EVs) are attracting attention. In particular, the growth of the plug-in hybrid vehicle, which utilizes both an engine and a battery by charging the battery, and the growth of the pure electric vehicle, which utilizes only electrical energy, are remarkable.

The plug-in hybrid vehicle refers to a vehicle that utilizes both an internal combustion engine and electric power of a battery. The plug-in hybrid vehicle travels by use of electric power of the battery charged by putting a plug into a household electrical outlet or an external electrical outlet, and the plug-in hybrid vehicle may travel by use of the gasoline engine when the electric power of the charged battery is completely consumed. Therefore, the plug-in hybrid vehicle has higher fuel economy than a vehicle using only the general internal combustion engine.

Unlike the plug-in hybrid vehicle, the electric vehicle EV refers to a vehicle that utilizes only electric power of a battery. The electric vehicle may travel by use of electric power of the battery charged by putting a plug into a household electrical outlet or an external electrical outlet, and the electric vehicle is called a true environment-friendly vehicle because the electric vehicle do not use the internal combustion engine at all.

This environment-friendly vehicle utilizes electric power of the charged battery to operate a motor and requires a separate charger for charging the battery.

Among the chargers in the related art, a low-speed charging controller has a 2-stage electric power control structure including a power factor correction (PFC) circuit and a DC-DC converter.

The power factor correction circuit serves to correct a power factor of an alternating current (AC) voltage and convert the AC voltage into a direct current (DC) voltage.

The DC-DC converter serves to charge the battery by transforming the DC voltage, which is outputted from the power factor correction circuit, into the voltage suitable for the battery.

An output terminal of the DC-DC converter is connected to the battery to transfer energy, and a capacitor is provided in the output terminal.

Meanwhile, the battery and the output terminal of the DC-DC converter need to be connected first before charging the battery with the low-speed charging controller.

When the battery and the output terminal of the DC-DC converter are connected in accordance with an initial charging operation, an inrush current is generated due to a difference in voltage between the battery and the capacitor, and the inrush current causes a problem of decreasing a lifespan of the capacitor.

Generally, a separate resistance element and a high-voltage relay element are applied between the battery and the output terminal of the DC-DC converter to reduce the inrush current, but in the instant case, there is a problem in that a size of a circuit and costs are increased.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a system for charging a battery, which prevents the occurrence of inrush current by controlling charging of a capacitor when the system is connected to the battery in accordance with an initial charging operation.

To achieve the above-mentioned object, a system for charging a battery for a vehicle according to various exemplary embodiments of the present invention includes: a charging control device having a power factor correction circuit configured to convert an alternating current (AC) voltage of a charging apparatus into a direct current (DC) voltage, a DC-DC converter connected to the power factor correction circuit and configured to transform the DC voltage, a capacitor connected to an output terminal of the DC-DC converter, and a relay unit provided between the capacitor and the battery; and a control unit connected to the charging control device and configured to perform initial charging control in consideration of a capacitor voltage of the capacitor when the charging apparatus and the power factor correction circuit are connected by the control unit.

When the capacitor voltage is equal to or lower than a reference voltage, the control unit may determine that the initial charging control is required, and perform PWM control on the DC-DC converter in accordance with the initial charging control.

When it is determined that the initial charging control is required, the control unit may set a maximum frequency required for the PWM control and set a duty ratio so that the duty ratio is gradually increased.

When charging of the capacitor is completed in accordance with the PWM control on the DC-DC converter, the control unit may perform relay-on control on the relay unit to connect the charging control device and the battery.

When the DC-DC converter and the battery are connected, the control unit may perform the PFM control on the DC-DC converter, and a voltage of the charging apparatus may be transformed into a battery charging voltage in accordance with the PFM control.

The relay unit may include a first relay connected between a first output terminal of the DC-DC converter and a positive voltage terminal of the battery, and a second relay connected between a second output terminal of the DC-DC converter and a negative voltage terminal of the battery.

The system for charging a battery for a vehicle according to the exemplary embodiment of the present invention controls the charging of the capacitor when the system is connected to the battery in accordance with the initial charging operation, preventing the occurrence of inrush current and preventing a decrease in the lifespan of the capacitor.

The foregoing BRIEF SUMMARY is illustrative only and is not intended to be limiting. In addition to the illustrative aspects, embodiments, and features described above, further aspects, embodiments, and features will become apparent by reference to the drawings and the following detailed description.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
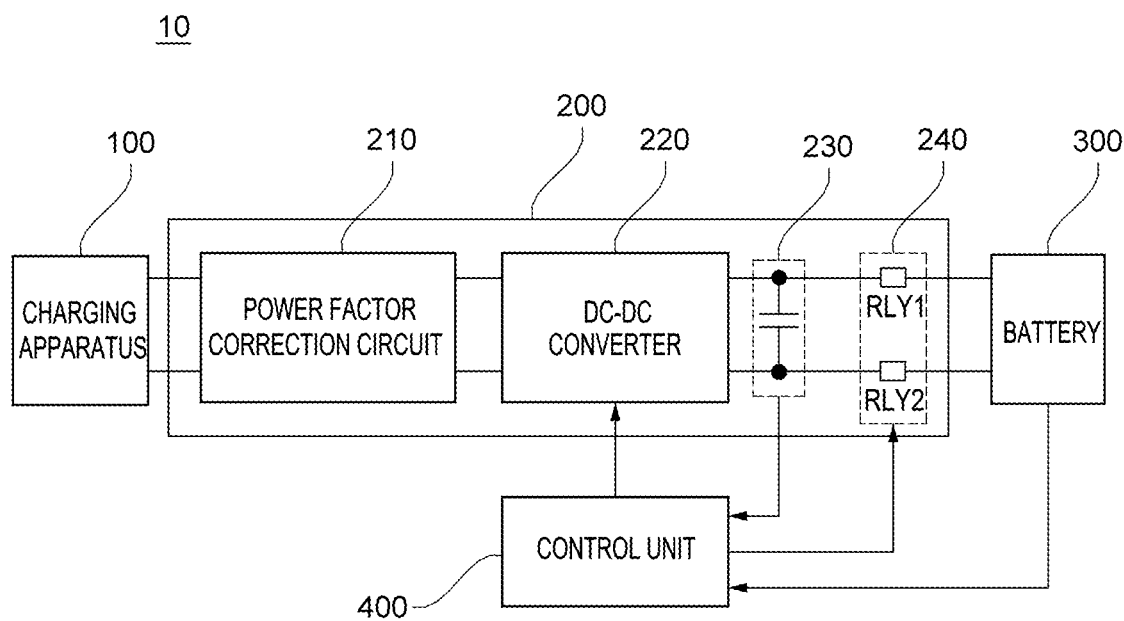
FIG. 1 is a block diagram of a system for charging a battery for a vehicle according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the accompanying drawings. First, in assigning reference numerals to constituent elements of the respective drawings, it may be noted that the same constituent elements will be designated by the same reference numerals, if possible, even though the constituent elements are illustrated in different drawings. Furthermore, the exemplary embodiments of the present invention will be described below, but the technical spirit of the present invention is not limited thereto and may of course be modified and variously conducted by those skilled in the art.

FIG. 1 is a block diagram of a system for charging a battery for a vehicle according to various exemplary embodiments of the present invention.

Referring to FIG. 1, a system 10 for charging a battery for a vehicle according to various exemplary embodiments of the present invention includes a charging apparatus 100, a charging control device 200, and a battery 300.

The charging apparatus 100 may be a kind of electric vehicle supply equipment (EVSE). The charging apparatus 100 may be an electric charger for a general home or an electric charger for an electric vehicle charging station.

The charging control device 200 may be a vehicle-mounted on-board charger (OBC). The charging control device 200 may include a power factor correction circuit 210, a DC-DC converter 220, a capacitor 230, and a relay unit 240.

The power factor correction circuit 210 may be a power factor correction (PFC) circuit. The power factor correction circuit 210 may be configured to convert an alternating current (AC) voltage of the charging apparatus 100 into a direct current (DC) voltage. The power factor correction circuit 210 may be configured to correct a power factor of the AC voltage.

The DC-DC converter 220 may be configured to transform the DC voltage, which has been converted by the power factor correction circuit 210, into a voltage suitable for the battery 300. An output terminal of the DC-DC converter 220 may be connected to the battery 300 to transmit the transformed DC voltage to the battery 300.

The capacitor 230 may be connected in parallel to an output terminal of the DC-DC converter 220.

The relay unit 240 may include a first relay RLY1 provided between a first output terminal of the DC-DC converter 220 and a positive voltage terminal of the battery 300, and a second relay RLY2 provided between a second output terminal of the DC-DC converter 220 and a negative voltage terminal of the battery 300. In the exemplary embodiment of the present invention, the first relay RLY1 and the second relay RLY2 may be high-voltage relays.

The battery 300 may be, but not limited to, a high-voltage battery for supplying an operating voltage to a drive motor and an electric system in the vehicle.

When the charging apparatus 100 and the charging control device 200 are connected to charge the battery 300, the control unit 400 may determine whether initial charging control is required. When the voltage of the capacitor 230 is equal to or lower than a predetermined reference voltage, the control unit 400 may determine that the initial charging control is required. In the instant case, the reference voltage may be appropriately set depending on a user or vehicle specifications.

When it is determined that the initial charging control is required, the control unit 400 controls the DC-DC converter 220 with a pulse width modulation (PWM) method. In the instant case, a separate sensing device may detect whether the electric vehicle charging apparatus 100 and the charging control device 200 are connected. In the instant case, the voltage of the charging apparatus 100 is transformed into a capacitor charging voltage by the power factor correction circuit 210 and the DC-DC converter 220, and the capacitor charging voltage is supplied to the capacitor 230.

When the charging of the capacitor 230 is completed, the control unit 400 controls the first relay RLY1 and the second relay RLY2 of the relay unit 240 to switch to a relay ON state. In the relay ON state of the relay unit 240, the output terminal of the DC-DC converter 220 is connected to the battery 300. In the instant case, since the capacitor 230 is already in the charged state, no inrush current is generated.

Thereafter, the control unit 400 charges the battery 300 by controlling the DC-DC converter 220 with the pulse frequency modulation (PFM) method. In the instant case, the voltage of the charging apparatus 100 is transformed into a battery charging voltage by the power factor correction circuit 210 and the DC-DC converter 220, and the battery charging voltage is supplied to the battery 300.

As described above, according to the system 10 for charging a battery according to the exemplary embodiment of the present invention, the capacitor 230 is completely charged in advance during the operation of initially charging the battery, and as a result, there is an effect of preventing the occurrence of inrush current without requiring a separate resistance element for initial charging.

Figure 2:
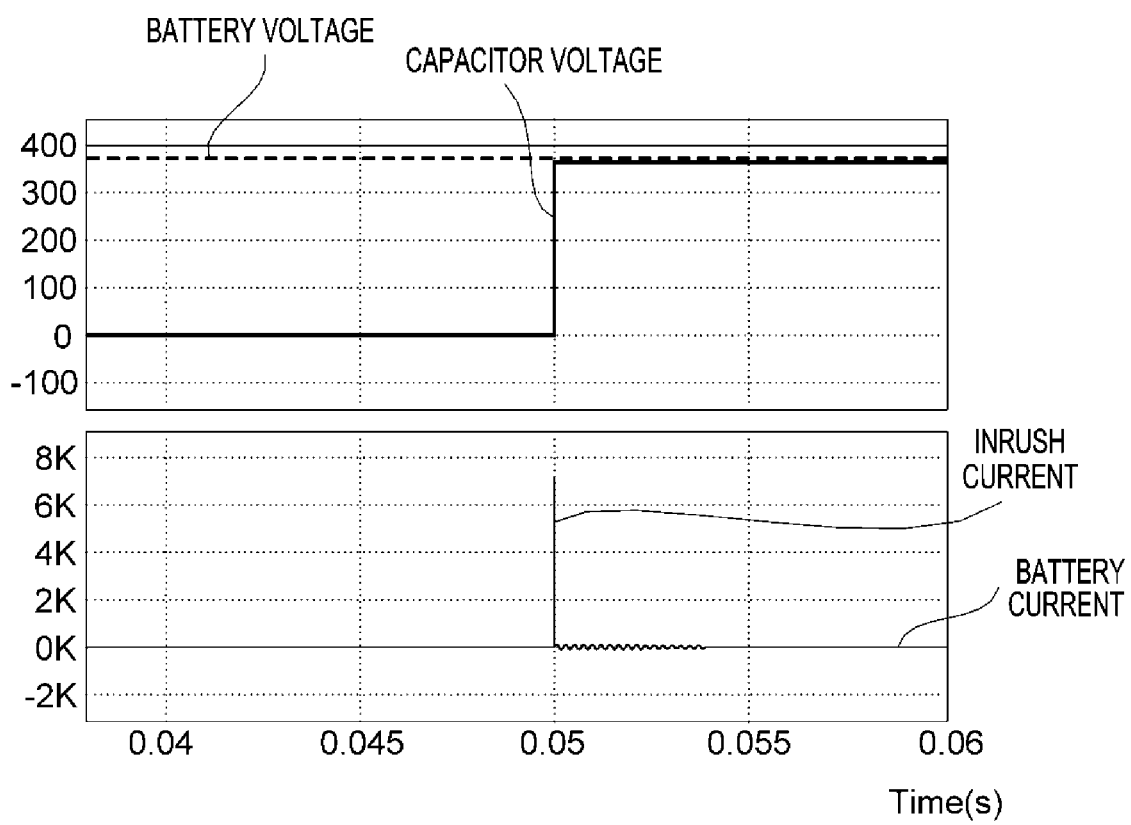
FIG. 2 is a view for explaining a state of a capacitor voltage in accordance with an inrush current.

FIG. 2 is a view for explaining a state of a capacitor voltage in accordance with an inrush current.

Referring to FIG. 2 an inrush current is generated due to a difference in voltage between the battery 300 and the capacitor 230 at a point in time at which approximately 0.05 second has elapsed after the charge control device 200 and the battery 300 are connected. In the instant case, the capacitor 230 is rapidly charged and has a voltage equal to the battery voltage. As the present situation continues, the lifespan of the capacitor 230 is shortened.

Figure 3:
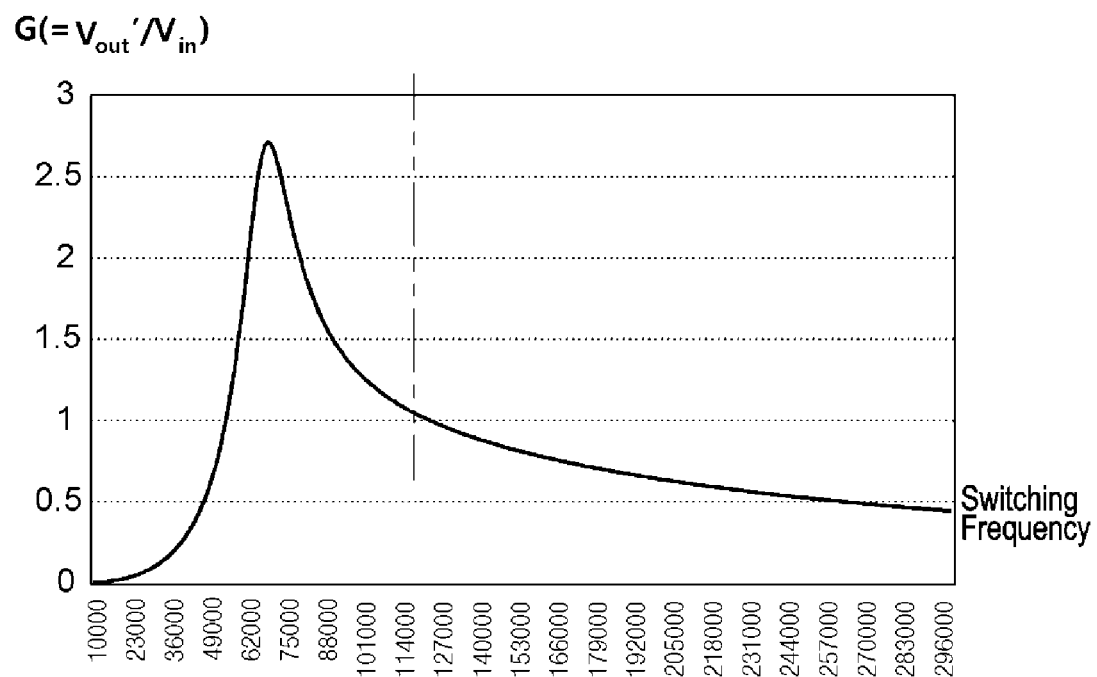
FIG. 3 is a graph illustrating input and output gains of a CLLC converter.

FIG. 3 is a graph illustrating input and output gains of a CLLC converter.

Referring to FIG. 3, in a case in which the DC-DC converter 220 includes a CLLC converter circuit, gain values with respect to switching frequencies may be ascertained. A gain G may be expressed as an output voltage Vout with respect to an input voltage Vin.

Figure 4:
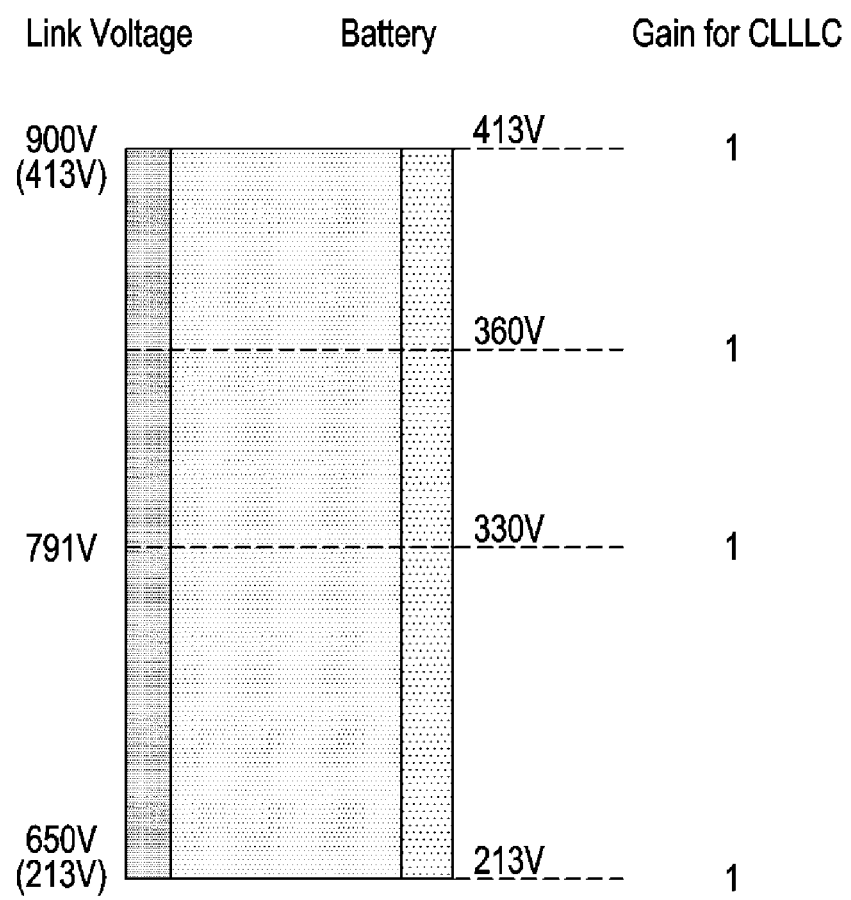
FIG. 4 is a view exemplarily illustrating gains with respect to voltages when charging and discharging a battery.

FIG. 4 is a view exemplarily illustrating gains with respect to voltages when charging and discharging a battery.

Referring to FIG. 4, in a case in which the DC-DC converter 220 includes a CLLLC converter circuit, a gain in accordance with PFM control may be 1.

Figure 5:
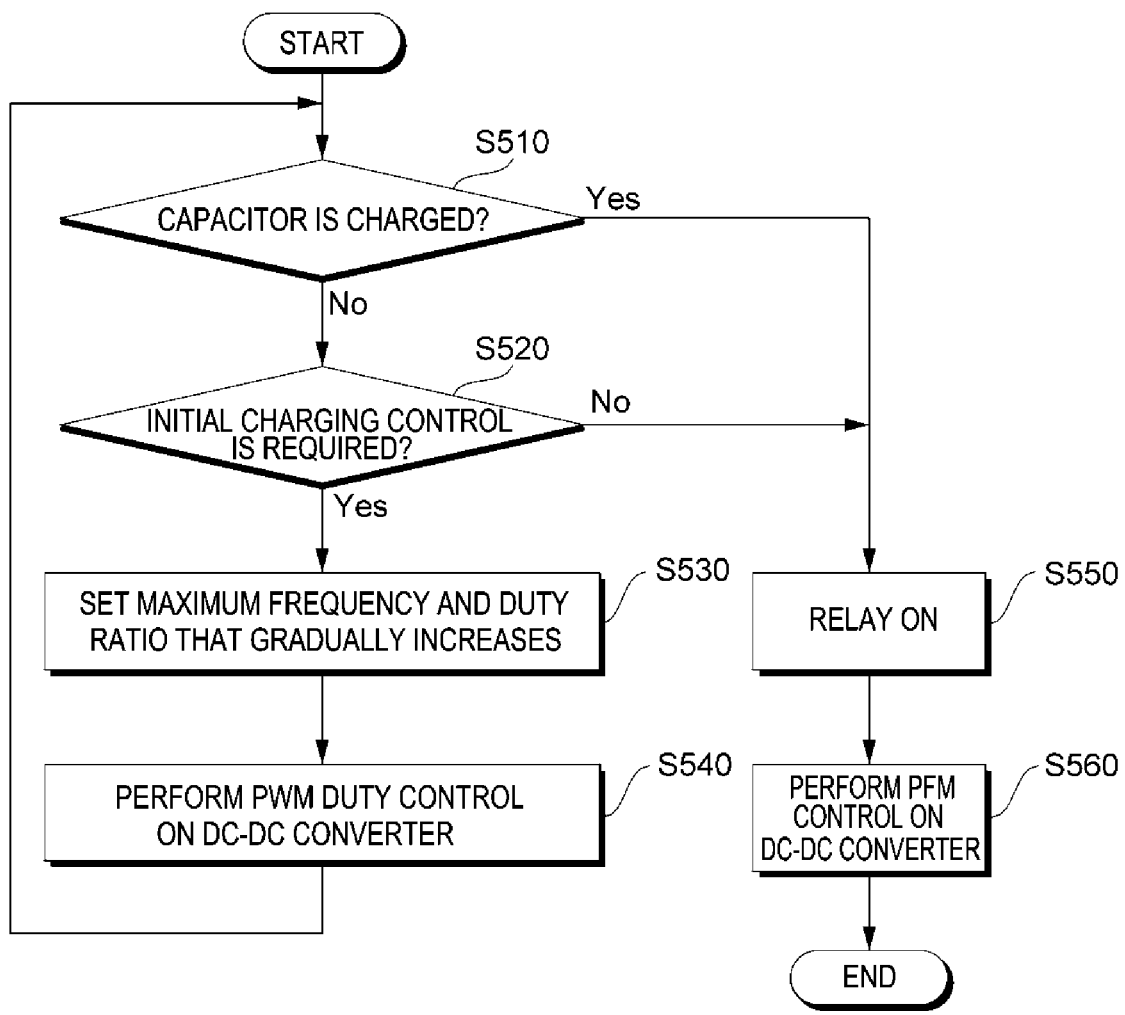
FIG. 5 is a flowchart of a method of charging a battery for a vehicle according to the exemplary embodiment of the present invention.

FIG. 5 is a flowchart of a method of charging a battery for a vehicle according to the exemplary embodiment of the present invention.

Referring to FIGS. 1 and 5, a method of charging a battery for a vehicle according to the exemplary embodiment of the present invention may include a charged state determination step S510, an initial charging control determination step S520, a setting step S530, a PWM control step S540, a relay-on step S550, and a PFM control step S550.

When the charging apparatus 100 and the charging control device 200 are connected, the control unit 400 determines a charged state of the capacitor 230 in the charged state determination step S510.

When the capacitor 230 is in a non-charged state, the control unit 400 determines whether the initial charging control is required, in the initial charging control determination step S520. When an output voltage value of the capacitor 230 is checked and determined as being equal to or lower than a reference voltage, the control unit 400 may determine that the initial charging control is required.

When it is determined that the initial charging control is required, the control unit 400 sets a maximum frequency and a duty ratio so that the duty ratio is gradually increased, in the setting step S530.

In the PWM control step S540, the control unit 400 performs the PWM control on the DC-DC converter 220 in accordance with the maximum frequency and the duty ratio. Therefore, the voltage of the charging apparatus 100 may be transformed into a capacitor charging voltage suitable for charging the capacitor 230.

When it is determined that the capacitor 230 is in the charged state or the initial charging control is not required, the control unit 400 performs relay-on control on the relay unit 240 in the relay-on step S550. In the instant case, the DC-DC converter 220 and the battery 300 are connected.

When the DC-DC converter 220 and the battery 300 are connected, the control unit 400 performs PFM control on the DC-DC converter 220 in the PFM control step S560. Therefore, the voltage of the charging apparatus 100 may be transformed into a battery charging voltage suitable for charging the battery 300. When the charging of the battery 300 is completed, the control unit 400 may perform relay-off control on the relay unit 240.

In an exemplary embodiment of the present invention, the control unit 400 is connected to the DC-DC converter 220, the capacitor 230, the relay unit 240 and the battery 300.

The above description is simply provided for illustratively describing the technical spirit of the present invention, and those skilled in the art to which various exemplary embodiments of the present invention pertains will appreciate that various modifications, changes, and substitutions are possible without departing from the essential characteristic of the present invention. Accordingly, the exemplary embodiments included in various exemplary embodiments of the present invention and the accompanying drawings are intended not to limit but to describe the technical spirit of the present invention, and the scope of the technical spirit of the present invention is not limited by the exemplary embodiments and the accompanying drawings.

The steps or the operations according to various exemplary embodiments of the present invention may be simultaneously incurred in other exemplary embodiments in another order, in parallel, or for another epoch, which will be understood by those skilled in the art.

Depending on various exemplary embodiments of the present invention, a portion or all of the steps and/or the operations may be implemented or performed by use of one or more processors driving a command stored in one or more non-temporary computer-readable media, a program, an interactive data structure, a client, and/or a server. An example of the one or more non-temporary computer-readable media may be software, firmware, hardware, and/or any combination thereof. Furthermore, a function of "module" discussed in the exemplary embodiment may be implemented by software, firmware, hardware, and/or any combination thereof.

Furthermore, the term "controller", "control unit" or "control device" refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips.

Alternatively, the memory and the processor may be integrated in a single chip. The processor may be implemented as one or more processors.

The controller or the control unit may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a controller, and the controller may be configured by a plurality of controllers, or an integrated single controller.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A system for charging a battery for a vehicle, the system comprising:
   a charging control device having a power factor correction circuit configured to convert an alternating (AC) voltage of a charging apparatus into a direct current (DC) voltage, a DC-DC converter connected to the power factor correction circuit and configured to transform the DC voltage, a capacitor connected to an output terminal of the DC-DC converter, and a relay unit provided between the capacitor and the battery; and
   a control unit connected to the charging control device and configured to perform initial charging control in consideration of a capacitor voltage of the capacitor by determining a charged state of the capacitor when the charging apparatus and the power factor correction circuit are connected by the control unit,
   wherein when the control unit determines that the capacitor voltage is equal to or lower than a reference voltage by directly checking the output voltage of the capacitor, the control unit is configured to conclude that the initial charging control is required, and is configured to perform pulse width modulation (PWM) control on the DC-DC converter in accordance with the initial charging control, and
   wherein upon concluding, by the control unit, that the initial charging control is required, the control unit is configured to set a maximum frequency required for the PWM control and to set a duty ratio for the PWM control so that the duty ratio is gradually increased.

2. The system of claim 1, wherein when charging of the capacitor is completed in accordance with the PWM control on the DC-DC converter, the control unit connected to the relay unit is configured to perform relay-on control on the relay unit to connect the charging control device and the battery.

3. The system of claim 2, wherein when the DC-DC converter and the battery are connected, the control unit is configured to perform the pulse frequency modulation (PFM) control on the DC-DC converter, so that a voltage of the charging apparatus is transformed into a battery charging voltage in accordance with the PFM control.

4. The system of claim 1, wherein the relay unit includes:
   a first relay connected between a first output terminal of the DC-DC converter and a positive voltage terminal of the battery; and
   a second relay connected between a second output terminal of the DC-DC converter and a negative voltage terminal of the battery.

5. The system of claim 4, wherein the capacitor is connected to the first output terminal of the DC-DC converter and the second output terminal of the DC-DC converter.

6. A method for charging a battery via a charging control device having a power factor correction circuit configured to convert an alternating (AC) voltage of a charging apparatus into a direct current (DC) voltage, a DC-DC converter connected to the power factor correction circuit and configured to transform the DC voltage, a capacitor connected to an output terminal of the DC-DC converter, and a relay unit provided between the capacitor and the battery, the method comprising:
   determining, by a control unit connected to the charging control device, a charged state of the capacitor connected between the DC-DC converter and the relay unit, when the charging apparatus is connected to the charging control device,
   determining, by the control unit, whether an initial charging control is required, and
   setting, by the control unit, a maximum frequency and a duty ratio required for pulse width modulation (PWM) control so that the duty ratio is increased, upon concluding that the initial charging control is required, and performing the PWM control on the DC-DC converter in accordance with the maximum frequency and the duty ratio so that a voltage of the charging apparatus is transformed into a capacitor charging voltage for charging the capacitor,
   wherein when the control unit determines that the capacitor voltage is equal to or lower than a reference voltage by directly checking the output voltage of the capacitor, the control unit is configured to conclude that the initial charging control is required, and is configured to perform pulse width modulation (PWM) control on the DC-DC converter in accordance with the initial charging control, and wherein upon concluding, by the control unit, that the initial charging control is required, the control unit is configured to set the maximum frequency required for the PWM control and to set the duty ratio for the PWM control so that the duty ratio is gradually increased.

7. The method of claim 6, wherein upon determining that the capacitor is in the charged state or the initial charging control is not required, the control unit is configured to perform relay-on control on the relay unit.

8. The method of claim 7, wherein, when the DC-DC converter and the battery are connected via the relay-on control on the relay unit, the control unit is configured to perform pulse frequency modulation (PFM) control on the DC-DC converter connected to the control unit.

9. The method of claim 6, wherein when charging of the capacitor is completed in accordance with the PWM control on the DC-DC converter, the control unit connected to the relay unit is configured to perform relay-on control on the relay unit to connect the charging control device and the battery.

10. The method of claim 6, wherein the relay unit includes:
    a first relay connected between a first output terminal of the DC-DC converter and a positive voltage terminal of the battery; and
    a second relay connected between a second output terminal of the DC-DC converter and a negative voltage terminal of the battery.

11. The method of claim 10, wherein the capacitor is connected to the first output terminal of the DC-DC converter and the second output terminal of the DC-DC converter.

12. The method of claim 6, wherein the control unit includes:
    a processor; and
    a non-transitory storage medium on which a program for performing the method of claim 8 is recorded and executed by the processor.

13. A non-transitory computer readable medium on which a program for performing the method of claim 6 is recorded.

* * * * *